Feb. 20, 1934.  F. L. SHELOR  1,948,190
FLUID PRESSURE CONTROLLED BRAKE MECHANISM
Filed Nov. 2, 1931
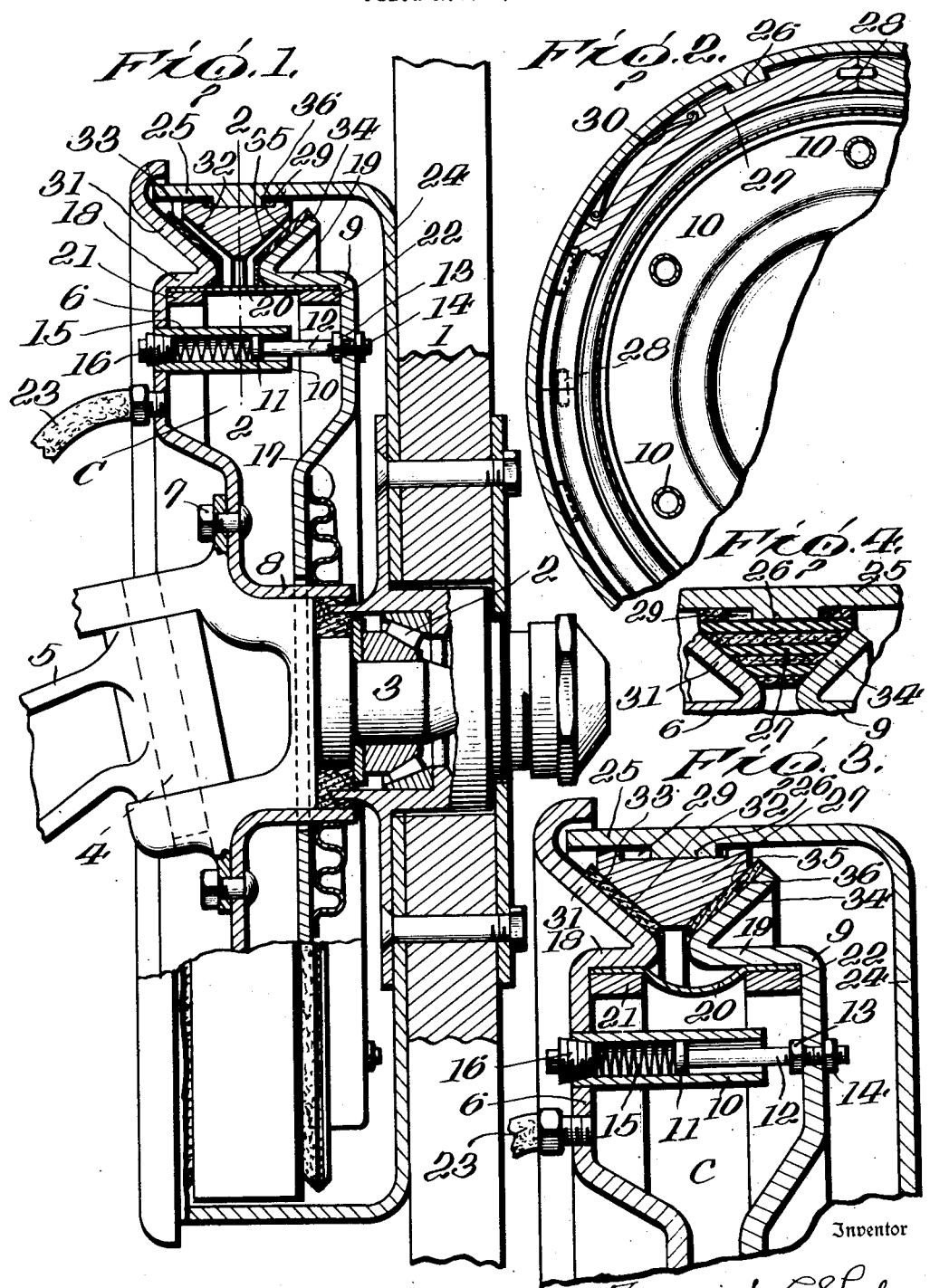
Inventor
Frederick L. Shelor
By Sturtevant, Mason & Porter
Attorneys Patented Feb. 20, 1934

1,948,190

UNITED STATES PATENT OFFICE 1,948,190

FLUID PRESSURE CONTROLLED BRAKE MECHANISM

Frederick L. Shelor, Sandston, Va., assignor, by direct and mesne assignments, to Innovation Brakes Incorporated, Richmond, Va., a corporation of Virginia Application November 2, 1931. Serial No. 572,705

8 Claims. (Cl. 188—152)

The invention relates to new and useful improvements in a braking mechanism for rotating parts and more particularly to a fluid pressure controlled braking mechanism.

An object of the invention is to provide a braking mechanism which includes two disks, one of which is stationary and the other of which is held from rotation but which is movable toward and from the stationary disk for applying and releasing the braking surfaces.

A further object of the invention is to provide a braking mechanism wherein a non-rotating annular disk carrying a braking surface makes direct contact with a braking surface movable with a rotating member with which the braking mechanism is associated.

A still further object of the invention is to provide a braking mechanism wherein a non-rotating stationary disk and a non-rotating disk movable relative thereto are provided with braking surfaces adapted to engage a braking surface on a rotatable part with which said mechanism is associated, which braking surface on the rotatable part is movable with the rotatable part and axially thereof.

A still further object of the invention is to provide a braking mechanism which includes spaced annular disks located in a plane of a rotating member with which the braking mechanism is associated wherein a closed chamber is formed between the disks by a fabric section attached to the disks and serving to limit the movement of the disks away from each other and wherein said disks, as they move toward and from each other, apply and release the braking surfaces.

These and other objects of the invention will in part be obvious and in part be hereinafter more fully disclosed.

In the drawing which shows by way of illustration one embodiment of the invention:

Figure 1 is a vertical sectional view through a vehicle wheel showing the braking mechanism applied thereto.

Figure 2 is a section on the line 2—2 of Figure 1.

Figure 3 is an enlarged transverse section on a larger scale and showing the braking surfaces in engagement for stopping the rotating part.

Figure 4 is a detail in section showing a slightly modified form of the braking member on the rotatable part.

The invention is directed to a braking mechanism adapted to be applied to any rotating part but particularly adapted for use in connection with motor vehicles. In my application Serial No. 569,986 filed October 20, 1931, there is shown and described a braking mechanism wherein two annular disks spaced from each other are movable relative to each other and are utilized for applying and releasing the braking surfaces for controlling the rotating part.

In the present application there is illustrated a different embodiment of the broad invention of the earlier application. In this application there is a stationary disk mounted on the frame of a vehicle and a non-rotating movable disk associated therewith. The stationary disk is provided with a hub portion which extends through an opening in the movable disk. A flexible diaphragm connected to the movable disk and the hub of the stationary disk closes the inner side of the chamber between the disks. A fabric section is connected to the disks at a distance radially away from the hub and thus forms a closed chamber between the two disks. There are springs for normally forcing the movable disk away from the stationary disk and the fabric limits the extent of movement of the movable disk and not only permits the movable disk to move toward the stationary disk but assists in that movement when the chamber is placed under vacuum. These disks are all located within a drum attached to the movable member and forming a part thereof. On this drum is a member having braking surfaces. This member rotates with the drum and is movable axially on the drum. The disks are each provided with a brake shoe surface adapted to contact with this braking surface on the drum and thus the disks make direct contact with the braking surface on the drum for controlling the movement thereof.

Referring more in detail to the drawing, the invention is shown as applied to a motor vehicle wheel which is indicated at 1. This motor vehicle wheel is mounted on a bearing 2 carried by a supporting spindle 3 formed as a part of the spindle frame 4. This spindle frame 4 is attached to an axle 5 so that the wheel may be turned relative to the axle. These parts are of the usual construction and form no part of the invention. Mounted on this spindle frame 4 is an annular disk 6 which is secured to the spindle frame by bolts 7 so that it is held in a fixed position thereon. There is a stationary non-rotating disk. The disk is provided with a hub portion 8. Associated with the stationary disk 6 is a non-rotating disk 9 which is annular. The opening in this disk 9 is slightly larger than the diameter of the hub 8 so that the disk 9 slips on over the hub and is free to move along the hub relative to the disk 6.

Attached to the disk 6 are a series of tubular members 10 which may be formed integrally therewith or welded thereto or secured to the disk 6 in any other suitable way. These tubular members form a housing for the head 11 of the rod 12 which is secured to the disk 9. A nut 13 on the rod bears against the inner face of the disk and a nut 14 threaded onto the rod is threaded tight against the outer face of the disk. Thus it not only makes a rigid connection for the rod 12 but an air-tight connection. Within the tubular member 10 is a spring 15 bearing at one end against the head 11 and at the other end against an abutment cap screw 16. It is noted that there are a series of these tubular members 10 and associated with each member is a spring. These springs normally operated to separate the disks. Attached to the disk 9 is a diaphragm 17. This diaphragm is also attached to the hub 8 and forms an air-tight connection between the disks which permits the disk 9 to move toward and from the disk 6. The diaphragm is deflected, permitting this movement. The disk 6 is bent outwardly above this support and the supporting attachment to the spindle frame 4. The disk 9 is similarly bent outwardly, thus forming between the disks a chamber C. The disk 6 is bent inwardly at 18, thus forming the other side of the chamber and the disk 9 is also bent inwardly at 19. Attached to the two disks is a fabric member 20 which is clamped to the respective disks by clamping rings 21, 22. This fabric is so dimensioned as to limit the movement of the disk 9 away from the disk 6 through the action of the springs on the disk 9. A pipe 23 is threaded into the disk 6 and this pipe leads to a suitable vacuum creating means so that the chamber C may be placed under vacuum. When this chamber is placed under vacuum, the atmospheric pressure against the movable disk 9 will move said disk toward the disk 6. The atmospheric pressure on the fabric 20 will bend it inwardly and pull the disk 9 toward the disk 6.

Attached to the vehicle wheel 1 is a brake drum 24. The brake drum is provided with an overhanging cylindrical portion 25. Said cylindrical portion 25 is provided with a series of inwardly extending lugs 26. Located within the brake drum is a braking member 27 which is annular and which is formed in sections. The sections are joined by dowel pins at 28 which forms a substantially annular member. This braking member 27 is provided with transverse elongated recesses 29 which receive the lugs 26. These recesses are of substantially the same width as the lugs but are considerably longer than the lugs so as to permit the braking member 27 to move axially of the drum. The braking member, however, rotates with the drum and the vehicle wheel. Springs 30 are located in recesses in the brake member 27 and pressing inwardly on the sections of the braking member insure that the ends of the sections shall remain in contact and prevent rattling or pounding of the sections on the drum when the braking surfaces are released. This braking member 27 is substantially V-shaped in cross section, thus forming two braking surfaces which are inclined toward each other.

The disk 6 is provided with an outwardly inclined portion 31, the inner face of which is substantially parallel with the inner face 32 of the braking member 27. A liner 33 is attached to the disk 6. The disk 9 is provided with an outwardly inclined portion 34, the inner face of which is substantially parallel with the inner face 35 of the braking member 27. The liner 36 is applied to the disk 9.

In Figure 1 of the drawing, the braking mechanism is shown released. The chamber C is open to the atmosphere and the springs 15 are separating the disks, thus separating the braking surfaces.

In Figure 3 of the drawing, the brake is shown as applied. The chamber C has been placed under vacuum and the atmospheric pressure against the disk 9 and the fabric 20 has forced the disk 9 toward the disk 6 bringing the braking surface carried by the disk 9 into contact with the braking surface of the braking member 27. This forces the braking member axially of the drum until it contacts with the braking surface on the stationary disk 6. It will be noted that by the inclined braking surface a more or less wedging braking force is obtained and an extended braking surface is provided within the relatively small axial range of the drum. The hub 8 contacting with the spindle frame enables a chamber between the disks to be created which is relatively large. Thus there is provided a relatively large area which is under the differential air pressure when the chamber is subjected to vacuum. This enables atmospheric pressure to be utilized for creating a proper braking pressure.

In Figure 4 of the drawing there is shown a modified form of braking member attached to the rotatable part. In this form of the invention the braking member 27 consists of a moulded high friction composition. When this member is made up of a moulded composition, it takes the place of the liner shown in Figures 1 and 3.

It will be obvious that minor changes in the details of construction and the arrangement of parts may be made without departing from the spirit of the invention as set forth in the appended claims.

Having thus described the invention, what I claim as new and desire to secure by Letters Patent, is:

1. In a braking mechanism, the combination of a rotatable member, an annular braking member attached to the rotatable member and moving therewith and having a movement thereon axial of the rotating member, a non-rotating stationary disk having a braking surface adapted to engage the annular braking member, a non-rotatable disk movable relative to the stationary disk and having a braking surface adapted to engage the annular braking member, spring means for separating said disks, a fabric connecting said disks and limiting the movement of the disks away from each other and forming one side of a chamber which may be placed under vacuum for shifting the movable disk, a diaphragm connecting said movable disk and said stationary disk for closing the chamber and permitting relative movement of the disks.

2. In a braking mechanism, the combination of a rotatable member, an annular braking member attached to the rotatable member and moving therewith and having a movement thereon axial of the rotating member, a non-rotating stationary disk having a braking surface adapted to engage the annular braking member, a non-rotatable disk movable relative to the stationary disk and having a braking surface adapted to engage the annular braking member, spring means for separating said disks, a fabric connecting said disks and limiting the movement of the disks away from each other and forming one side of a chamber which may be placed under vacuum for shifting the movable disk, a diaphragm connecting said movable disk and said stationary disk for closing the chamber and permitting relative movement of the disks, said spring means including a tubular member attached to one of the disks, a rod attached to the other disk and having a head sliding in said tubular member, and a spring within said tubular member bearing against said head.

3. In a braking mechanism, the combination of a rotatable member, an annular braking member attached to the rotatable member and moving therewith and having a movement thereon axial of the rotating member, a non-rotating stationary disk having a braking surface adapted to engage the annular braking member, a non-rotatable disk having a braking surface adapted to engage the annular braking member, spring means for separating said disks, a fabric connecting said disks and limiting the movement of the disks away from each other and forming one side of a chamber which may be placed under vacuum for shifting the movable disk, a diaphragm connecting said movable disk and said stationary disk for closing the chamber and permitting relative movement of the disks, said annular braking member having its braking surfaces inclined inwardly toward each other, the braking surfaces on said disks being parallel to the respective braking surfaces on said annular braking member with which said disks cooperate.

4. In a braking mechanism, the combination of a rotatable member, a braking member secured to said rotatable member for rotation therewith and axial movement thereon, a non-rotating stationary disk, a non-rotating disk associated therewith and movable relative thereto, said disks having braking surfaces adapted to engage the braking member, and means connecting said disks and forming a closed chamber therebetween adapted to be placed under a pressure differing from that of atmospheric pressure for causing an engagement between the braking surface on the non-rotating disk and the braking member.

5. In a braking mechanism, the combination of a rotatable member, a braking member secured to said rotatable member for rotation therewith and axial movement thereon, said braking member having braking faces inclining toward each other, a non-rotating stationary disk, a non-rotating disk associated therewith and movable relative thereto, said disks having braking surfaces parallel with and adapted to engage the respective braking surfaces on the rotatable member, and flexible means connecting said disks and forming a closed chamber therebetween adapted to be placed under vacuum for causing the braking surfaces on the non-rotating disks to engage the braking surfaces on the braking member.

6. In a braking mechanism, the combination of a rotatable member, a braking member secured to said rotatable member for rotation therewith and axial movement thereon, said braking member having braking faces inclining toward each other, a non-rotating stationary disk, a non-rotating disk associated therewith and movable relative thereto, said disks having braking surfaces parallel with and adapted to engage the respective braking surfaces on the rotatable member, flexible means connecting said disks and forming a closed chamber therebetween adapted to be placed under vacuum for causing the braking surfaces on the non-rotating disks to engage the braking surfaces on the braking member, and spring means disposed between said disks and separating the same when the vacuum is released.

7. In a braking mechanism, the combination of a rotatable member, a braking member secured to said rotatable member for rotation therewith and axial movement thereon, said braking member being formed of segments splined together at the ends thereof, yielding means between the segments and the rotating member, non-rotating disks movable relative to each other and having braking surfaces adapted to engage the braking member, and flexible means connecting said disks and forming a closed chamber therebetween adapted to be placed under pressure differing from that of atmospheric pressure for causing the engagement of said braking surfaces on said disks with said braking member.

8. In a braking mechanism, the combination of a rotatable member, a braking member secured to said rotatable member for rotation therewith and axial movement thereon, said braking member being formed of segments splined together at the ends thereof, yielding means between the segments and the rotating member, non-rotating disks movable relative to each other and having braking surfaces adapted to engage the braking member, and flexible means connecting said disks and forming a closed chamber therebetween adapted to be placed under pressure differing from that of atmospheric pressure for causing the engagement of said braking surfaces on said disks with said braking member, the braking surface being disposed in planes inclining outwardly away from each other, and said braking member having braking surfaces parallel with the respective braking surfaces on said disks.

FREDERICK L. SHELOR.